US009740449B2

(12) United States Patent
Takagi

(10) Patent No.: US 9,740,449 B2
(45) Date of Patent: Aug. 22, 2017

(54) ONBOARD DISPLAY SYSTEM

(71) Applicant: DENSO CORPORATION, Kariya, Aichi-pref. (JP)

(72) Inventor: Kenichi Takagi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 14/648,403

(22) PCT Filed: Dec. 5, 2013

(86) PCT No.: PCT/JP2013/007143
§ 371 (c)(1),
(2) Date: May 29, 2015

(87) PCT Pub. No.: WO2014/118845
PCT Pub. Date: Aug. 7, 2014

(65) Prior Publication Data
US 2015/0317948 A1    Nov. 5, 2015

(30) Foreign Application Priority Data

Jan. 30, 2013 (JP) .................................. 2013-15949

(51) Int. Cl.
G09G 5/12 (2006.01)
B60K 37/00 (2006.01)
G06F 3/14 (2006.01)

(52) U.S. Cl.
CPC ............ G06F 3/1438 (2013.01); B60K 37/00 (2013.01); G09G 5/12 (2013.01); *G09G 2380/10* (2013.01)

(58) Field of Classification Search
CPC ........ G06F 3/1438; B60K 37/00; G09G 5/12; G09G 2380/10
See application file for complete search history.

(56) References Cited

U.S. PATENT DOCUMENTS 4,652,853 A    3/1987  Tagami et al.
8,200,796 B1 *  6/2012  Margulis ............... G06F 3/1431
                                                    709/217

(Continued)

FOREIGN PATENT DOCUMENTS

JP    S64-21488 A    1/1989

OTHER PUBLICATIONS

International Search Report of the International Searching Authority dated Feb. 10, 2014 in the corresponding International application No. PCT/JP2013/007143 (and English translation).

(Continued)

*Primary Examiner* — Andrew Sasinowski
(74) *Attorney, Agent, or Firm* — Posz Law Group, PLC

(57) ABSTRACT

An onboard display system includes two display groups; each display group includes a display apparatus and a control apparatus. The first control apparatus of the first display group includes the following: a first state acquisition section that acquires a first operating state of the first control apparatus itself; a second state acquisition section that acquires a second operating state of the second control apparatus of the second display group; a state determination section that determines whether a display prioritization state takes place based on the first operating state and the second operating state; and an image update section that updates, in chronological order, images in a video displayed in the first display apparatus of the first display group when the display prioritization state takes place or that suspends the updating when the display prioritization state does not take place.

10 Claims, 13 Drawing Sheets

(56) References Cited

U.S. PATENT DOCUMENTS

| | | | | |
|---|---|---|---|---|
| 9,235,374 B2* | 1/2016 | Sirpal | .................. | G06F 3/1438 |
| 9,524,027 B2* | 12/2016 | Sirpal | .................. | G06F 3/1438 |
| 9,594,538 B2* | 3/2017 | Jouin | .................... | G06F 3/1438 |
| 2005/0140567 A1* | 6/2005 | Ishizu | .................. | G06F 3/1431 |
| | | | | 345/1.3 |

OTHER PUBLICATIONS

Written Opinion of the International Searching Authority dated Feb. 10, 2014 in the corresponding International application No. PCT/JP2013/007143 (and English translation).

* cited by examiner

ONBOARD DISPLAY SYSTEM

CROSS REFERENCE TO RELATED APPLICATION APPLICATIONS

The present disclosure is a U.S. national stage of International Application No. PCT/JP2013/007143 filed on Dec. 5, 2013 and is based on Japanese Patent Application No. 2013-15949 filed on Jan. 30, 2013, the disclosures of which are incorporated herein by reference.

TECHNICAL FIELD

The present disclosure relates to an onboard display system installed in a vehicle.

BACKGROUND ART

There is conventionally known an onboard display system mounted in a vehicle, the system including a plurality of display apparatuses located at mutually different positions and at least one electronic control apparatus outputting a video signal to the display apparatuses.

The onboard display system is requested to display, of images constituting a video, images that need be displayed on the display apparatuses while being interlocked with one another at appropriate time points that permit occupants to be kept from feeling uncomfortable. Such images include images constituting an animation presented at system startup or images constituting a motion picture of various alerts.

To respond to the above request, a centralized rendering type onboard display system is proposed. This system connects a single electronic control apparatus to a plurality of display apparatuses over transmission lines dedicated to a video signal, and visualizes a video signal produced by the electronic control apparatus in the display apparatuses (patent literature 1).

PRIOR ART LITERATURES

Patent Literature

Patent Literature 1: JP2005-134479A

SUMMARY OF INVENTION

Many electronic control apparatuses and sensors are installed in an ordinary vehicle. This increases difficulty in preserving a place for disposing a new electronic control apparatus in vicinity of a target of its control. The disposition place of the control apparatus may be therefore separated away from the display apparatuses in the centralized rendering type onboard display system.

The centralized rendering type onboard display system thus needs to have long transmission lines for a video signal from the electronic control apparatus to the respective display apparatuses. In addition, the video signal produced by the electronic control apparatus in the centralized rendering type onboard display system carries a large amount of data and requires the transmission lines (wirings) transmitting the video signal to be thick. The existing centralized rendering type onboard display system needs to preserve a space in a vehicle necessary for the wirings from the electronic control apparatus to the respective display apparatuses.

In-vehicle electronic control apparatuses are however interconnected over a transmission line communicating information; this disables to provide a space for laying down another transmission line newly in the vehicle.

The centralized rendering type onboard display system like in patent literature 1 is thus not readily realized because a space is not found in a vehicle for laying down transmission lines.

Another decentralized rendering type onboard display system may be proposed, the system including a plurality of display apparatuses and a plurality of electronic control apparatuses that control the respective display apparatuses. The system enables the electronic control apparatuses to produce the same video and output the video to the respective display apparatuses, each of which is a target of control of each electronic control apparatus.

The decentralized rendering type onboard display system need not have a transmission line newly laid down because the display apparatuses are connected to the respective electronic control apparatuses in advance over transmission lines, and need not take account of a space in a vehicle for laying down the new transmission line.

However, the decentralized rendering type onboard display system requires each electronic control apparatus to produce a video signal. Images that are represented by the video signal and are interlocked with one another cannot be readily displayed on the display apparatuses at appropriate time points for keeping an occupant from feeling uncomfortable.

In short, in a situation not providing a space for deposition of a transmission line in a vehicle, the conventional art does not permit images that are interlocked with one another to be readily displayed on the display apparatuses at appropriate time points for keeping an occupant from feeling uncomfortable.

It is an object of the present disclosure to provide a technology for displaying images, which are interlocked with one another, on a plurality of display apparatuses at appropriate time points in a situation not permitting providing of a space for deposition of a transmission line in a vehicle.

To achieve the above object, according to a first example, an onboard display system including at least two control apparatuses is provided as follows. Each control apparatus is connected to a display apparatus via a video line that transmits a video signal and achieves (i) a display function that displays a video based on the video signal and (ii) a non-display function that is at least one function different from the display function. A first control apparatus being any one of the at least two control apparatuses includes a first state acquisition section, a first state output section, a second state acquisition section, a state determination section, and an image update section.

The first control apparatus achieves the display function by executing a video output command that is previously prepared to include an image group of images that are displayed one by one in chronological order, the video output command serving as a command outputting the image group as a video. The first state acquisition section acquires a first operating state that is an operating state of the first control apparatus itself.

The first state output section outputs the first operating state acquired by the first state acquisition section to a second control apparatus via an onboard line that is a transmission line transmitting a signal. The second control apparatus is any one of the at least two control apparatuses excluding the first control apparatus. The second control apparatus is provided as an independent body separated from the first control apparatus and connected with the first control apparatus via the onboard line. The second state acquisition section acquires a second operating state that is an operating state of the second control apparatus.

The state determination section determines whether a display prioritization state or a non-display prioritization state takes place. The display prioritization state takes place when both the first operating state and the second operating state prioritize realization of the display function over realization of the non-display function; the non-display prioritization state takes place when at least one of the first operating state and the second operating state prioritizes realization of the non-display function over realization of the display function.

The image update section performs an image update control. The image update control executes an update of the images, which are included in the video displayed in the display apparatus in chronological order when the state determination section determines that the display prioritization state takes place. The image update control suspends the update of the images when the state determination section determines that the non-display prioritization state takes place.

The onboard display system updates images constituting a video when a display prioritization state is established. Once display initiation time points for the video are squared with each other, even the images that should be displayed while being interlocked with one another can be displayed on the display apparatuses at appropriate time points which keep an occupant from feeling uncomfortable.

The above images that should be displayed while being interlocked with one another (images that are interlocked with one another) include images whose information is displayed by switching from one display apparatus to the other or images each of which should have display time points thereof on a plurality of display apparatuses squared with each other (that is, should have the display time points thereof synchronized with each other). A concrete example of the images that should be displayed while being interlocked with one another (images that are interlocked with one another) may be images constituting an animation to be presented at the time of system startup or a motion picture giving any of various alerts.

In particular, in an onboard display system of the first example, information has to be newly communicated between control apparatuses in order to display images, which are displayed while being interlocked with one another, on display apparatuses at appropriate time points, which keep an occupant from feeling uncomfortable. Such information only need contain a small amount of data, that is, a first operating state or second operating state.

The onboard display system of the first example may adopt a transmission line conventionally used for information communication between the control apparatuses as an onboard line. A new transmission line thus need not be laid down. Supposing a new transmission line interconnecting the control apparatuses is laid down, a cable having a small diameter may be employed. A space in a vehicle required for disposition of the transmission line may be infinitesimally narrow.

In short, the first example can provide a technology for displaying images, which are interlocked with one another, on display apparatuses at appropriate time points, which keep an occupant from feeling uncomfortable in a situation in which a space for deposition of a transmission line is not found in a vehicle.

Further, in the first example, the state determination section may determine whether the display prioritization state or the non-display prioritization state takes place with predetermined time intervals; and the image update section may perform the image update control each time the state determination section determines whether the display prioritization state or the non-display prioritization state takes place.

According to the onboard display system of the first example, whether the display prioritization state is established can be determined at predefined time intervals, and image update control can be implemented every time a determination is made.

Therefore, according to the onboard display system of the first example, display time points at which images that are interlocked with one another are displayed on the display apparatuses can be set to appropriate time points which keep an occupant from feeling uncomfortable.

In the onboard display system of the first example, the first control apparatus may further include a time acquisition section that acquires a present clock time that is a clock time at present. The state determination section may determine whether the display prioritization state or the non-display prioritization state takes place each time the present clock time acquired by the time acquisition section reaches a predetermined clock time. The image update section may perform the image update control each time the state determination section determines whether the display prioritization state or the non-display prioritization state takes place.

According to the onboard display system of the first example, whether the display prioritization state is established can be determined at each of predefined time points, and image update control can be implemented at every time a determination is made.

Therefore, according to the onboard display system of the first example, display time points at which images that are interlocked with one another are displayed on the display apparatuses can be set to appropriate time points which keep an occupant from feeling uncomfortable.

To achieve the above object, according to a second example of the present disclosure, an onboard display system including at least two control apparatuses is provided as follows. The at least two control apparatuses are connected via an onboard line that is a transmission line transmitting a signal. Each control apparatus is connected to a display apparatus via a video line which transmits a video signal. Each control apparatus achieves a display function that displays a video based on the video signal and a non-display function that is at least one function different from the display function. Each control apparatus achieves the display function by (i) executing a video output command that is previously prepared to include an image group of images and a display priority level indicating a degree of a priority of each of the images against the realization of the non-display function, the images being displayed one by one in chronological order, the video output command serving as a as a command that outputs the image group as a video and (ii) updating the images each time a predetermined clock time comes. Each control apparatus includes a video interpretation section and a function control section. The video interpretation section acquires the video output command and determines whether a display prioritization state takes place or not based on a result of analyzing the acquired video output command, the display prioritization state taking place when realization of the display function is prioritized over realization of the non-display function. The function control section performs a display prioritization control. When the video interpretation section determines that the display prioritization state takes place, the display prioritization control suppresses realization of the non-display function while securing a resource necessary for realization of the display function to realize the display function preferentially.

According to the onboard display system of the second example, a display function is exerted by a control apparatus in which a resource is preserved. Once display initiation time points for a video are squared with each other, even images that should be displayed while being interlocked with one another can be displayed on the display apparatuses at appropriate time points which keep an occupant from feeling uncomfortable.

In particular, in the onboard display system of the second example, information has to be newly communicated between the control apparatuses in order to display images, which are displayed while being interlocked with one another, on the display apparatuses at appropriate time points that keep an occupant from feeling uncomfortable; the information only need contain a small amount of data, that is, identification information identifying a video output command with which a video is displayed on the display apparatuses.

The onboard display system of the second example may adopt a transmission line conventionally used for information communication between the control apparatuses as an onboard line; a new transmission line thus need not be laid down. A new transmission line interconnecting the control apparatuses may be laid down by employing a cable having a small diameter. This permits a space in a vehicle required for disposition of a transmission line to be infinitesimally narrow.

In short, the second example can provide a technology for displaying images, which are interlocked with one another, on the display apparatuses at appropriate time points, which keep an occupant from feeling uncomfortable, in a situation not providing a space for deposition of a transmission line in a vehicle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the present disclosure will be described below in conjunction with the drawings.

First Embodiment

<Onboard Display System>

Figure 1:
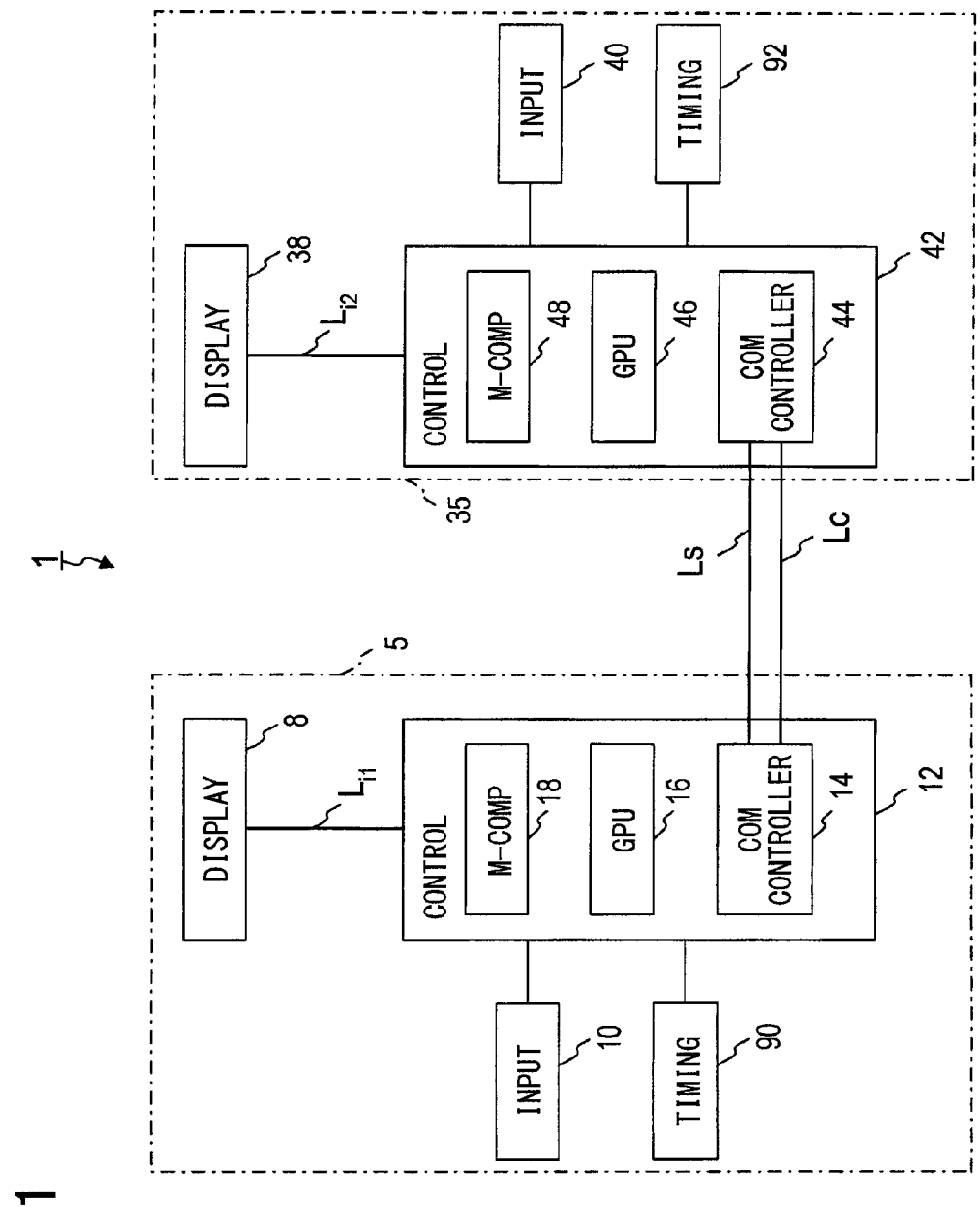
FIG. 1 is a block diagram showing an outline configuration of an onboard display system of a first embodiment to which the present disclosure is applied.

An onboard display system 1 shown in FIG. 1 is installed in an automobile, and includes at least two display groups (may be referred to as display sets) 5 and 35 that display various kinds of information and present the information to an occupant. A vehicle in which the system is installed may be referred to as a host vehicle or a subject vehicle.

In the present application, information is used not only as an uncountable noun but also as a countable noun.

The display group 5 in the present embodiment is of a meter system that presents various kinds of information to an occupant of a host vehicle by an instrument panel of the host vehicle. The display group 5 includes at least a display apparatus 8, input reception unit 10, timing unit 90, and control apparatus 12.

The display group 35 in the present embodiment is included in a known navigation system that guides a route to a destination, which is designated according to an entry made externally, based on a current position of a host vehicle and an azimuth of an advancing direction thereof. The display group 35 includes at least a display apparatus 38, input reception unit 40, timing unit 92, and electronic control apparatus 42.

In the present embodiment, the control apparatuses 12 and 42 are interconnected over a communication bus Ls serving as a transmission line (onboard line) over which various kinds of data items are transmitted. Data communication performed over the communication bus Ls may adopt a controller area network (CAN) protocol proposed by Robert Bosch GmbH and generally employed in onboard networks.

The display apparatus 8 in the display group 5 is a known display apparatus that displays a video (images) according to a video signal sent from the control apparatus 12, for example, a liquid crystal display disposed on the instrument panel of a host vehicle. The display apparatus 8 is connected to the control apparatus 12 over a communication line (hereinafter, may be referred to as a video line) Li1 over which a video signal is transmitted.

The input reception unit 10 is a known input terminal that receives an instruction or information entered by a user. The timing unit 90 may be called a time acquisition unit and acquires a current clock time that is a clock time at present. The timing unit 90 in the present embodiment may acquire a time signal, which is received by a GPS receiver, as the current clock time, or may acquire a reference clock time, which is employed in an onboard network, as the current clock time.

The control apparatus 12 is a known electronic control apparatus (ECU) including a communication controller 14, graphics processing unit (GPU) 16, and microcomputer (M-COMP) 18.

The communication controller 14 communicates various kinds of information over the communication bus Ls. The GPU 16 is a known processor that renders an image. The microcomputer 18 is a known computer including at least a ROM, RAM, CPU, and flash memory.

The ROM or flash memory of the microcomputer 18 stores a processing program permitting the microcomputer 18 to perform information presentation processing. This processing acquires results of sensing by various sensors in a vehicle, thereby produces information that represents a state of a host vehicle, and information that represents a traveling state thereof (hereinafter, referred to as host vehicle state information), and outputting the produced information from various meters or the display apparatus 8. The host vehicle state information produced through the information presentation processing includes information that represents a state of a host vehicle such as a vehicle speed, an engine speed, or a water temperature of a radiator, or various kinds of alerts dependent on a state in the vicinity of the host vehicle such as freezing of a road surface and a risk of a slip.

The ROM or flash memory of the microcomputer 18 stores a processing program executing information display processing of producing a video signal based on a video output command prepared beforehand and of outputting the video signal to the display apparatus 8.

Specifically, by performing information presentation processing, the control apparatus 12 achieves, as exertion of one of non-display functions that are assigned to the control apparatus 12, deducing of the host vehicle state information and outputting of the deduced information from various types of meters or the display apparatus 8. In addition, by performing information display processing, the control apparatus 12 achieves, as exertion of a display function, outputting of a video based on a video output command, to the display apparatus 38.

The display apparatus 38 in the display group 35 is a known display apparatus that displays a video (images) according to a video signal sent from the control apparatus 42, for example, a liquid crystal display in a known navigation system. The display apparatus 38 is connected to the control apparatus 42 over a transmission line (that is, a video line) Lit transmitting the video signal.

The input reception unit 40 is a known input terminal that receives an instruction or information entered by a user. In the present embodiment, the input reception unit 40 may be a touch panel formed as an integral part of the display apparatus 38.

The timing unit 92 may be called a time acquisition unit and acquires a current clock time that is a clock time at present. More particularly, the timing unit 92 in the present embodiment may acquire as the current clock time a time signal received by a GPS receiver or may acquire as the current clock time a reference clock time employed in an onboard network. Namely, the timing units 90 and 92 may be designed in any style as long as they can acquire a clock time serving as a reference and being squared with a corresponding time.

The control apparatus 42 is a known electronic control apparatus (ECU) including a communication controller 44, GPU 46, and microcomputer 48.

A position detector (unshown) and memory unit (unshown) are connected to the control apparatus 42. The position detector is known one to detect a current position of a host vehicle or an azimuth of an advancing direction, and includes at least a known GPS receiver, gyro sensor, and geomagnetic sensor.

The memory unit is a rewritable nonvolatile memory unit (for example, a hard disk drive or flash memory), and stores map data in advance. The map data includes node data relevant to nodes expressing specific points on a road (for example, intersections and branch points), link data relevant to links expressing roads each linking nodes, and cost data relevant to unit costs allocated in advance to the respective links. Further, the map data includes various kinds of data required to perform route guide processing, such as, road data, topographical data, mark data, intersection data, data of facilities, audio data for guidance, and audio recognition data.

The communication controller 44 communicates various kinds of information over the communication bus Ls. The GPU 46 is a known processor that renders images.

The microcomputer 48 is a known computer including at least a ROM, RAM, CPU, and flash memory.

The ROM or flash memory of the microcomputer 48 stores a processing program permitting the microcomputer 48 to perform route guide processing of collating a current position, which is specified based on information sent from the position detector, with the map data, and of guiding a route to a destination designated according to an entry made externally.

The control apparatus 42 is thus a known navigation electronic control apparatus that displays a map, which shows the vicinity of a current position specified based on the current position of a host vehicle, on the display apparatus 38, and performs route guide processing of guiding a route to a destination designated according to an entry made externally.

The ROM or flash memory of the microcomputer 48 stores a processing program permitting the microcomputer 48 to perform information display processing of producing a video signal based on a video output command prepared beforehand, and of outputting the video signal to the display apparatus 8.

Figure 2:
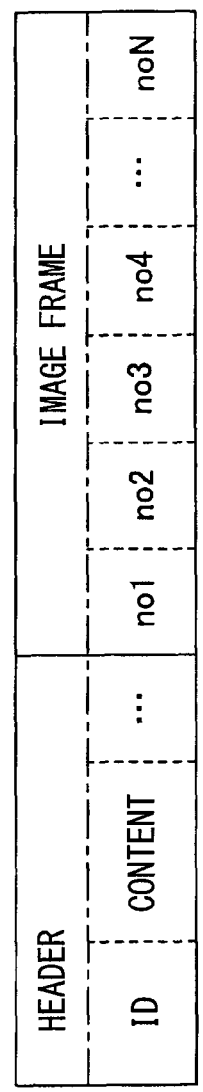
FIG. 2 is an explanatory diagram for explaining a video output command employed in the first embodiment.

The video output command is prepared beforehand for the contents of each video as a command that includes a group of images (image frames or image panels), which are sequentially displayed along a time base, and that allows the group of images to be outputted as a video (motion picture). The video output command includes, as in FIG. 2, a header signifying the contents of a command division of the command, and a group of images (image frames) constituting a motion picture to be displayed with the command.

The header includes at least (i) an identifier (ID) which distinguishes a video output command, and (ii) the contents of display signifying the contents of each of images that should be displayed (outputted). The group of image frames includes (i) N images (for example, 100 images (N=100)) that are sequentially displayed along a time base, and (ii) display time points at which the respective images should be displayed. The display time points may be indicated by defining time points at which outputting of the respective images is initiated by using the elapsed times since the initiation of outputting of the video.

A video that is constructed with a video output command includes images that should be displayed on the display apparatuses while being interlocked with one another (images that are interlocked with one another), for example, images whose informations are displayed by switching from one display apparatus to the other, or images each of which should have display time points on a plurality of display apparatuses squared with each other (that is, should have the display time points synchronized with each other). A concrete example of the video to be constructed with the video output command includes images constituting an animation to be presented at the time of system startup or a motion picture that gives any of various alerts.

Specifically, by performing route guide processing, the control apparatus 42 exerts as a non-display function, which is assigned to the control apparatus 12 itself, a route guide function that guides a route to a destination. In addition, by performing information display processing, the control apparatus 42 exerts a display function that displays various kinds of information on the display apparatus.

<Details of Control Apparatus>

Figure 3:
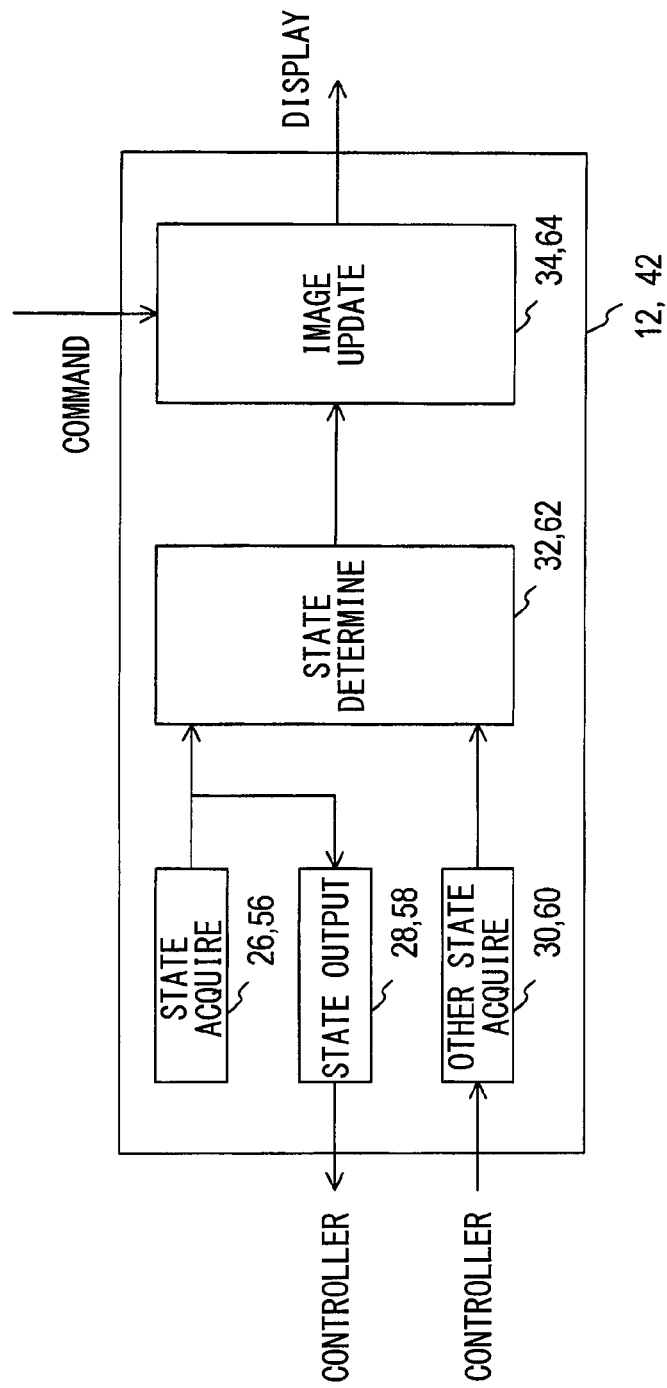
FIG. 3 is a functional block diagram of a control apparatus in the first embodiment.

In order to exert the display function, as in FIG. 3, the control apparatus 12 or 42 includes respectively a state acquisition section 26 or 56 (may be called a first state acquisition section), state output section 28 or 58 (may be called a first state output section), other state acquisition section 30 or 60 (may be called a second state acquisition section), state determination section 32 or 62, and image update section 34 or 64. The sections 26 (56), 28 (58), 30 (60), 32 (62), and 34 (64) are exerted when the control apparatus 12 or 42 performs information display processing. The sections may be referred to as devices or means.

Information display processing in the present embodiment is activated by each of the control apparatuses 12 and 42 when an activation command is inputted via the input reception unit 10 or 40. The sections 26, 28, 30, 32, and 34 of the control apparatus 12 are identical to the sections 56, 58, 60, 62, and 64 of the control apparatus 42. Hereinafter, the components of the control apparatus 42 out of the control apparatuses 12 and 42 will be described mainly. As for the components of the control apparatus 12, the reference signs will be written in parentheses and an iterative description will be omitted.

The state acquisition section 56 (26) may be called a first state acquisition section, and repeatedly acquires a first operating state that is the operating state of the control apparatus 42 (12). What is referred to as the first operating state is information signifying whether the control apparatus 42 (12) can immediately perform display processing. More particularly, when the control apparatus 42 (12) can immediately perform information display processing, for example, when the control apparatus 42 (12) is not performing route guide processing, the first operating state represents a state in which information display processing can be immediately performed (hereinafter, referred to as a ready state). In contrast, when the control apparatus 42 cannot immediately perform information display processing, for example, when the control apparatus 42 is performing route guide processing, the first operating state represents a state in which display processing cannot be immediately performed (hereinafter, referred to as a busy state).

The state output section 58 (28) may be called a first state output section. When the first operating state acquired by the state acquisition section 56 (26) is the busy state, the state output section outputs a signal, which signifies that the first operating state is the busy state, to the control apparatus 12 (42). The signal signifying that the first operating state is the busy state is transmitted over an onboard line Lc that is a dedicated transmission line. The onboard line Lc is included separately from the communication bus Ls, and links the control apparatuses 12 and 42.

The other state acquisition section 60 (30) may be called a second state acquisition section, and acquires a second operating state that is the operating state (that is, first operating state) of the control apparatus 12 (42). More particularly, the other state acquisition section 60 (30) acquires as the second operating state the operating state that is the busy state as represented by the signal outputted from the state output section 28 (58) of the control apparatus 12 (42).

Further, the state determination section 62 (32) determines whether at least one of the first operating state acquired by the state acquisition section 56 (26) and the second operating state acquired by the other state acquisition section 60 (30) signifies that a display prioritization state is established. The display prioritization state is where priority should be given to exertion of a display function rather than exertion of a non-display function different from the display function. More particularly, if the operating states acquired by the state acquisition section 56 (26) and other state acquisition section 60 (30) are not the busy states (that is, are the ready states), the state determination section 62 (32) determines that the display prioritization state is established. If at least one of the operating states acquired by the state acquisition section 56 (26) and other state acquisition section 60 (30) is the busy state, the state determination section 62 (32) determines that a non-display prioritization state is established.

Every time a predetermined defined clock time comes, the state determination section 62 (32) in the present embodiment determines whether the display prioritization state or non-display prioritization state is established. In the present embodiment, the condition determining that the predetermined defined clock time comes is a case where a current clock time obtained by the timing unit 92 (90) coincides with the defined clock time.

Further, if a result of determination made by the state determination section 62 (32) demonstrates that the display prioritization state is established, the image update section 64 (34) updates images, which constitute a video to be displayed on the display apparatus 38 (8), along a time base. If the result of determination demonstrates that the non-display prioritization state is established, the image update section implements image update control that suspends updating of the images that constitute the video to be displayed on the display apparatus 38 (8).

<Actions of Control Apparatus>

Figure 4:
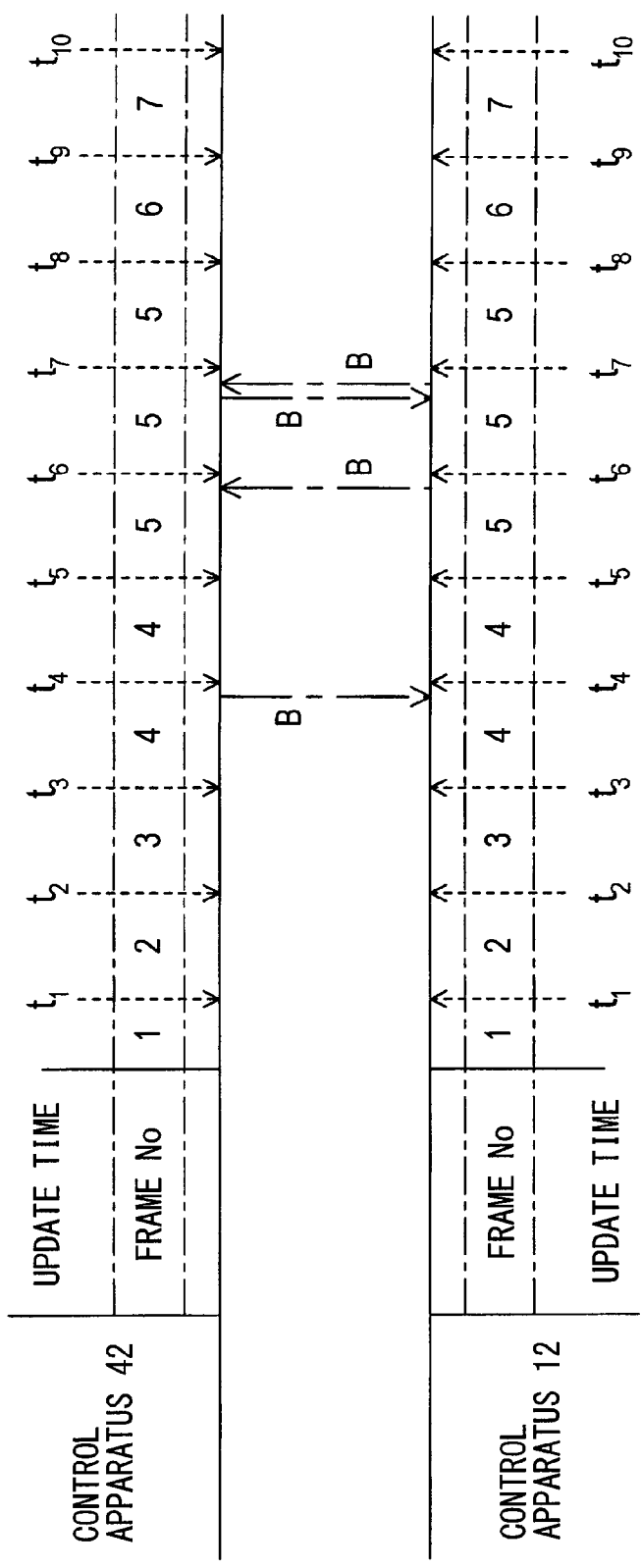
FIG. 4 is a time chart showing communicated states of control apparatuses in the first embodiment.

As in FIG. 4, when information display processing is activated, the state acquisition sections 56 and 26 of the control apparatuses 42 and 12 acquire the first operating state, and the other state acquisition sections 60 and 30 acquire the second operating state.

Every time a defined clock time t comes along a time base, the state determination sections 62 and 32 of the control apparatuses 42 and 12 determine based on the first operating state and second operating state whether the display prioritization state or non-display prioritization state takes place. If the results of determinations demonstrate that the control apparatuses 42 and 12 have entered the display prioritization state, the image update sections 64 and 34 of the control apparatuses 42 and 12 update one of image frames along the time base.

If the first operating state acquired by the state acquisition section 56 or 26 is the busy state, a signal signifying the fact ("B" in FIG. 4) is outputted to the control apparatus 12 or 42. If the operating states acquired by the state acquisition sections 56 and 26 in the control apparatuses 42 and 12 respectively are the busy states, the control apparatuses 12 and 42 allow the other state acquisition sections 30 and 60 to acquire a signal signifying that the operating state is the busy state ("B" in FIG. 4).

As mentioned above, if the operating state of at least one of the control apparatuses 12 and 42 is the busy state, the state determination sections 62 and 32 determine that the non-display prioritization state takes place. Further, the image update sections 34 and 64 suspend updating of one of image frames along a time base, and sustain previous display of image frames held on the display apparatuses 38 and 8.

The control apparatuses 42 and 12 repeat the processing sequence until all image frames included in the video output command are displayed on the display apparatuses 38 and 8.

Advantageous Effects of First Embodiment

Thus, according to the control apparatuses 12 and 42 of the present embodiment, when the display prioritization state takes place, images constituting a video are updated. Once display initiation time points for the video are squared with each other, even images that should be displayed while being interlocked with one another can be displayed on the display apparatuses at appropriate time points which keep an occupant from feeling uncomfortable. As a method of squaring the display initiation time points for the video with each other, for example, each of the control apparatuses 12 and 42 acquires the video output command identified with an identifier (ID) specified at the input reception unit 40, and initiates display according to a reference clock time.

In particular, in the onboard display system 1, information that has to be newly communicated between the control apparatuses 12 and 42 may have a small amount of data, such as, the first operating state or second operating state.

Therefore, according to the onboard display system 1, a cable having a small diameter may be adopted as the new onboard line Lc linking the control apparatuses 12 and 42. A space in a vehicle necessary for disposition of a transmission line may be infinitesimally small.

In short, the onboard display system 1 provides a technology for displaying images, which are interlocked with one another, on the display apparatuses at appropriate time points, which keep an occupant from feeling uncomfortable, even in a situation in which a space for deposition of a transmission line is not found in a vehicle.

The onboard display system 1 can make the determination as to whether the display prioritization state takes place or not at each of predefined clock times, and further implement the image update control every time the determination is made. Therefore, according to the onboard display system 1, display time points at which images that are interlocked with one another are displayed on the display apparatuses can be set to appropriate time points which keep an occupant from feeling uncomfortable.

Variants of First Embodiment

The first embodiment of the present disclosure has been described so far. The present disclosure is not limited to the first embodiment, but can be applied in various forms without a departure from the gist of the present disclosure.

For example, in the embodiment, the onboard line Lc is laid down as a transmission line linking the control apparatuses 12 and 42. The signal signifying that the operating state is the busy state is communicated over the onboard line Lc. The onboard line Lc may be excluded. In this case, the signal signifying that the operating state is the busy state may be communicated over the communication bus Ls.

Figure 5:
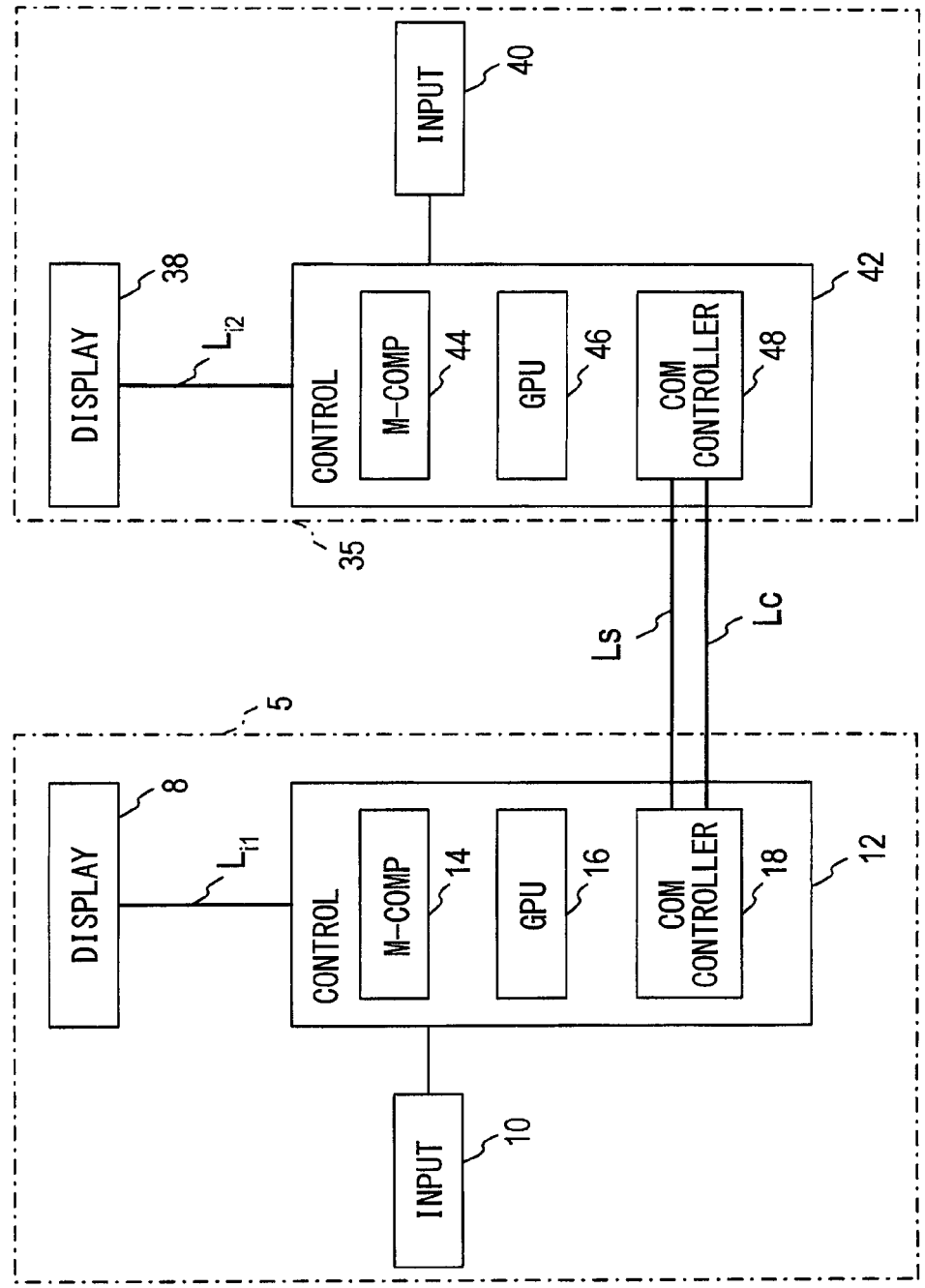
FIG. 5 is a block diagram showing an outline configuration of an onboard display system in accordance with a variant of the first embodiment.

The onboard display system 1 of the embodiment includes the timing units 90 and 92. However, the onboard display system 1 is not limited to the configuration including the timing units. For example, as in FIG. 5, an onboard display system 2 may have the timing units 90 and 92 excluded from the respective groups in the onboard display system 1.

Figure 6:
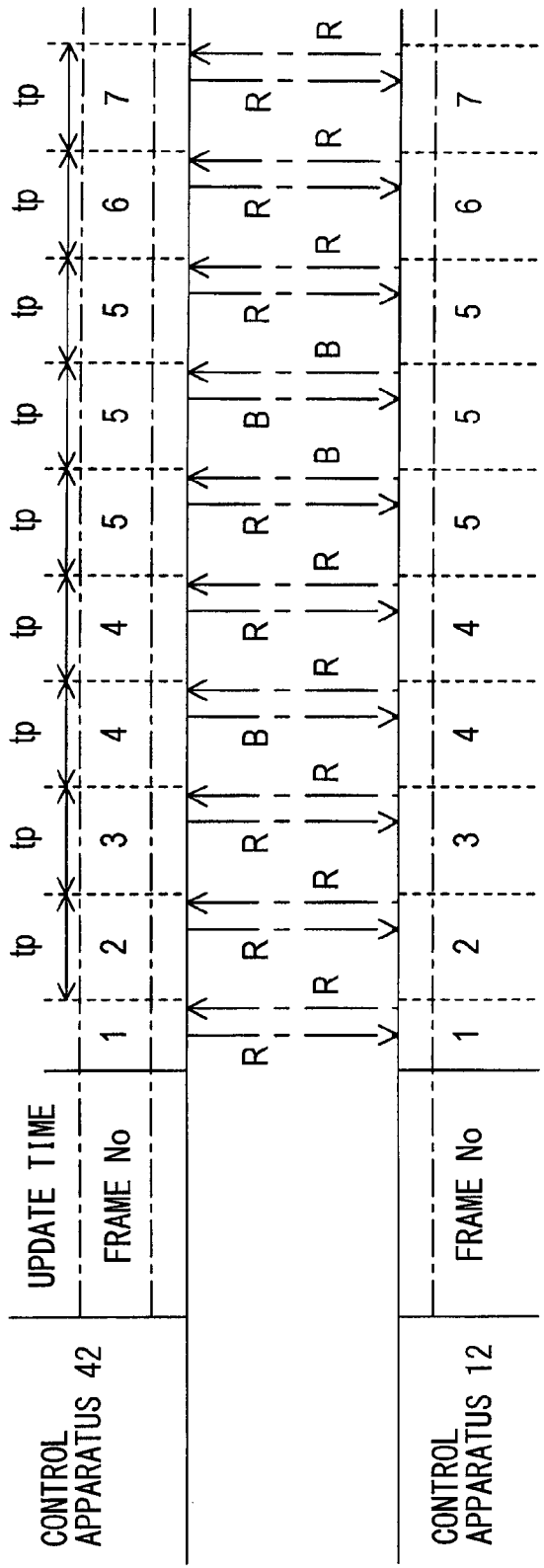
FIG. 6 is a time chart showing communicated states of control apparatuses in the variant of the first embodiment.

In this case, the state determination sections 32 and 62 in the control apparatuses 12 and 42 respectively may, as in FIG. 6, determine based on the first operating state and second operating state at predefined time intervals tp whether the display prioritization state or non-display prioritization state takes place. If the results of determinations made by the state determination sections 32 and 62 demonstrate that the display prioritization state takes place, the image update sections 34 and 64 update images, which constitute a video to be displayed on the display apparatuses 8 and 38, along a time base. If the results of determinations demonstrate that the non-display prioritization state takes place, updating of the images that constitute the video to be displayed on the display apparatuses 8 and 38 is suspended, and image frames previously displayed on the display apparatuses 8 and 38 are sustained.

Further, the state output section 58 (28) in the variant may, as in FIG. 6, output a signal, which represents the first operating state acquired by the state acquisition section 56 (26), to the control apparatus 42 (12). Specifically, irrespective of whether the first operating state is the busy state or ready state, the state output section 58 (28) may output the signal, which represents the first operating state acquired by the state acquisition section 56 (26), to the control apparatus 42 (12).

Even the onboard display system 2 can provide the same advantageous effects as the onboard display system 1 of the embodiment can.

Second Embodiment

An onboard display system 3 of a second embodiment is different from the onboard display system 1 of the first embodiment mainly in the structure of the video output command and the contents of information display processing. Therefore, in the present embodiment, the same reference signs will be appended to the same components and pieces of processing as those of the first embodiment, and an iterative description will be omitted. A description will be made mainly of the structure of the video output command and the information display processing which are different from those of the first embodiment.

<Onboard Display System>

Figure 7:
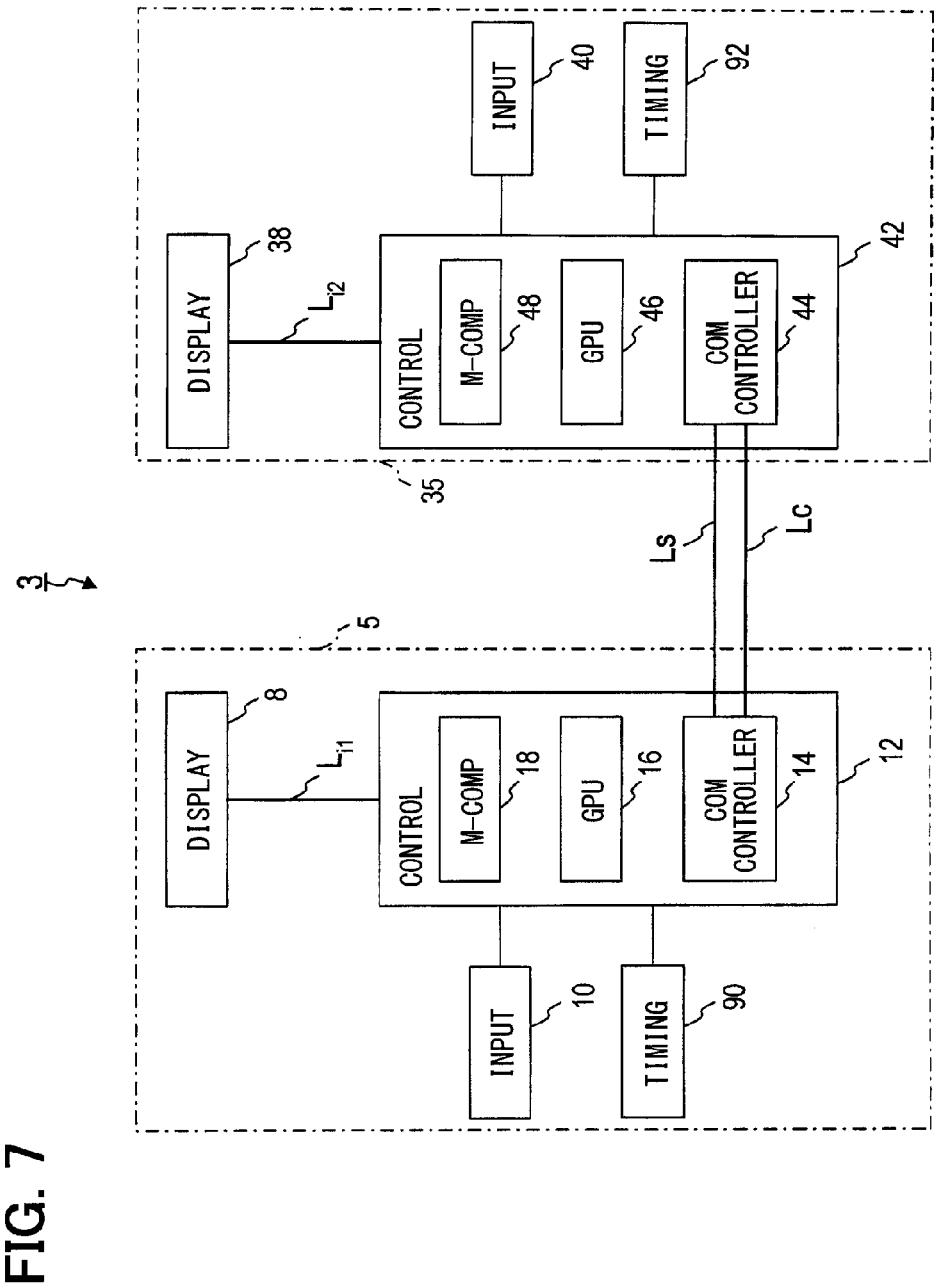
FIG. 7 is a block diagram showing an outline configuration of an onboard display system of a second embodiment to which the present disclosure is applied.

The onboard display system 3 of the present embodiment is, as shown in FIG. 7, a system to be installed in an automobile, and includes at least two display groups 5 and 35 that display various kinds of information and present them to an occupant. The configurations of the two display groups 5 and 35 are identical to those of the display groups in the first embodiment.

A video output command is prepared beforehand for the contents of each video as a command that includes a group of images (image frames) which are sequentially displayed along a time base and that allows the group of images to be outputted as a video (motion picture). More particularly, the video output command includes, as in FIG. 8, a header signifying the contents of a command division of the command, and a group of images (image frames) constituting a motion picture to be displayed with the command.

The header includes at least an identifier (ID) which distinguishes the video output command, and the contents of display representing the contents of each of images to be displayed (outputted). The group of image frames includes N images (for example, 100 images (N=100)) that are sequentially displayed along a time base, display time points at which the images should be displayed, and display priority levels each representing a degree to which priority is given to display of each of the images.

Figure 8:
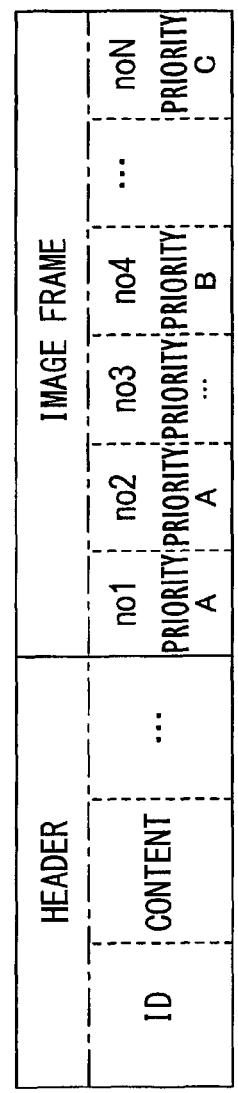
FIG. 8 is an explanatory diagram for explaining a video output command employed in the second embodiment.

What is referred to as a display time point is, for example, an elapsed time since initiation of outputting. What is referred to as a display priority level is a degree to which priority should be given to display of each of images in consideration of exertion of the non-display function. In FIG. 8, priority level A is the highest priority, and priority level . . . is the lowest priority.

A video to be constructed with the video output command includes images that should be displayed on the display apparatuses 8 and 38 while being interlocked with one another (images that are interlocked with one another), for example, images whose informations are displayed by switching from one display apparatus to the other, or images each of which should have display time points thereof on a plurality of display apparatuses squared with each other (that is, should have the display time points thereof synchronized with each other). As a concrete example of the video constructed with the video output command, images constituting an animation to be presented at the time of system startup or a motion picture giving any of various alerts are conceivable.

<Details of Control Apparatus>

The control apparatuses 12 and 42 in the onboard display system 3 of the present embodiment have a master-slave relationship with the control apparatus 42 as a master (primary control apparatus) and the control apparatus 12 as a slave (secondary control apparatus).

Figure 9:
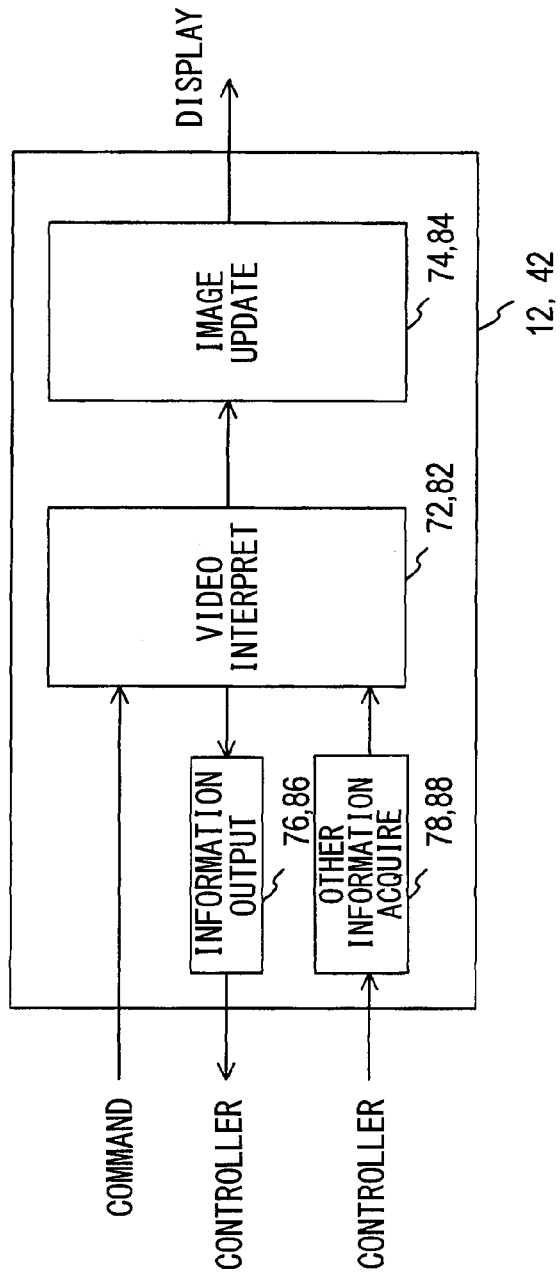
FIG. 9 is a functional block diagram of a control apparatus in the second embodiment.

For exertion of a display function, the control apparatus 12 or 42 includes, as shown in FIG. 9, a video interpretation section 72 or 83, image output section 74 or 84 (may be called a function control section), information output section 76 or 87 (may be called a beginning output section or ending output section), and other information acquisition section 78 or 88. These sections 72 (82), 74 (84), 76 (86), and 78 (88) are exerted when the control apparatus 12 (42) performs information display processing. The sections may be referred to as devices or means.

Information display processing in the present embodiment is activated by each of the control apparatuses 12 and 42 when an activation command is inputted via the input reception unit 40.

To begin with, the video interpretation section 82, image output section 84, information output section 86, and other information acquisition section 88 in the control apparatus 42 will be described below.

The video interpretation section 82 acquires and interprets a video output command. The video interpretation section 82 determines through analysis whether a display prioritization state is established by at least executing the video output command. More particularly, if an image for which priority should be given to exertion of a display function rather other than exertion of a non-display function is present among the images included in the video output command, the video interpretation section 82 determines that the display prioritization state is established, and identifies the image for which priority should be given to exertion of the display function (hereinafter, referred to as a prioritized display image).

If a display priority level associated with each of images included in a video output command is equal to or larger than a predetermined defined threshold, the video interpretation section 82 recognizes the image as a display prioritization image.

The image output section 84 may be called a function control section. Every time a defined clock time comes, images constituting a video are updated along a time base on the basis of a video output command. Meanwhile, a prioritized display image is identified as a result of analysis by the video interpretation section 82, and a time point at which the prioritized display image is displayed on the display apparatus 8 comes. At this time point, the image output section 84 implements in the control apparatus 42 display prioritization control that suppresses exertion of a non-display function, thereby exerting a display function by priority and preserving a resource necessary for exertion of the display function.

The display prioritization control may be known interrupt processing.

The information output section 86 may be called a beginning output section or ending output section. When a time point at which a display prioritization image is displayed comes, the information output section outputs a priority signal signifying that the image to be display at the time point is the display prioritization image. The priority signal is transmitted over the onboard line Lc that is a dedicated transmission line. The onboard line Lc is laid down separately from the communication bus Ls and links the control apparatuses 12 and 42.

The other information acquisition section 88 acquires a priority signal outputted from the information output section 76 in the control apparatus 12.

Next, the video interpretation section 72, image output section 74, information output section 76, and other information acquisition section 78 in the control apparatus 12 will be described below.

The video interpretation section 72, information output section 76, and other information acquisition section 78 are designed identically to the video interpretation section 82, information output section 86, and other information acquisition section 88 respectively. An iterative description will be omitted.

The image output section 74 may be called a function control section. Every time a defined clock time comes, the image output section updates images, which constitute a video, along a time base on the basis of a video output command. In addition, if the other information acquisition section 78 acquires a priority signal outputted from the information output section 86 in the control apparatus 42, the image output section 74 implements in the control apparatus 12 display prioritization control under which exertion of a non-display function is suppressed so that a display function can be exerted by priority, and a resource necessary for exertion of the display function is preserved.

As display prioritization control, for example, known interrupt processing is conceivable.

<Action of Control Apparatus>

Figure 10:
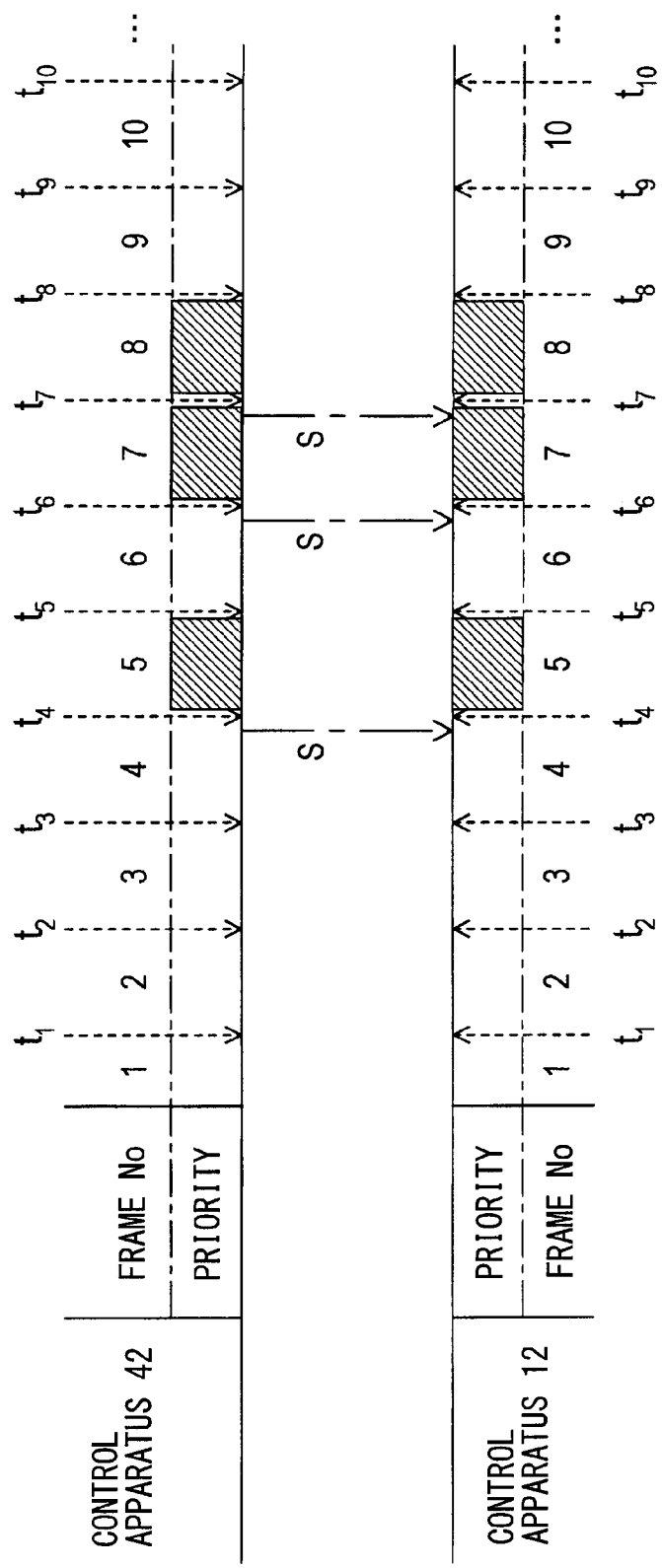
FIG. 10 is a time chart showing communicated states of control apparatuses in the second embodiment.

In the control apparatus 42 (12), when information display processing is activated, the video interpretation section 82 (72) analyses a specified video output command. The image output section 84 (74) included in the control apparatus 42 (12) updates, as shown in FIG. 10, one of image frames along a time base every time a defined clock time t comes.

Further, when a time point at which a prioritized display image (image hatched in FIG. 10) identified as a result of analysis by the video interpretation section 82 is displayed on the display apparatus 8 comes, the image output section 84 implements display prioritization control in the control apparatus 42. In addition, prior to the time point at which the prioritized display image is displayed on the display apparatus 8, the information output section 86 outputs a priority signal to the control apparatus 12.

When the other information acquisition section 78 acquires a priority signal outputted from the information output section 86 in the control apparatus 42, the image output section 74 of the control apparatus 12 implements display prioritization control in the control apparatus 12.

As mentioned above, according to the control apparatuses 12 and 42 implementing prioritization control, exertion of a non-display function is suppressed so that a display function can be exerted by priority, and a resource necessary for exertion of the display function is preserved.

The control apparatuses 12 and 42 repeat the processing sequence until all the image frames included in a video output command are displayed on the display apparatuses 8 and 38.

Advantageous Effects of Second Embodiment

As described so far, according to the onboard display system 3, a display function is exerted by the control apparatuses 12 and 42 in which a resource is preserved. Once the display initiation time points for a video are squared with each other, even images that should be displayed while being interlocked with one another can be displayed on the display apparatuses 8 and 38 at appropriate time points which keep an occupant from feeling uncomfortable.

In particular, in the onboard display system 3, information to be newly communicated between the control apparatuses 12 and 42 may be information having a small amount of data, such as, a priority signal.

Therefore, according to the onboard display system 3, the new onboard line Lc linking the control apparatuses 12 and 42 may be a cable having a small diameter. Eventually, a space in a vehicle necessary for disposition of the onboard line Lc may be infinitesimally small.

In short, the onboard display system 3 provides a technology for displaying images, which are interlocked with one another, at appropriate time points, which keep an occupant from feeling uncomfortable, in a situation in which a space for deposition of a transmission line is not found in a vehicle.

Variants of Second Embodiment

The second embodiment of the present disclosure has been described so far. The present disclosure is not limited to the embodiment, but can be applied to various forms without a departure from the gist of the present disclosure.

For example, in the second embodiment, the onboard line Lc is included as a transmission line linking the control apparatuses 12 and 42, and a priority signal is communicated over the onboard line Lc. However, the onboard line Lc may be excluded. In this case, the priority signal may be communicated over the communication bus Ls.

The video interpretation sections 72 and 82 included in the second embodiment determine in units of an image whether the display prioritization state is established. A unit in which whether the display prioritization state is established is determined is not limited to the image. Alternatively, an entire video output command will do or a plurality of images that are successive along a time base will do.

In the former case, the image output sections 74 and 84 may implement display prioritization control during a period from initiation of display of a video based on a video output command to termination of the display.

In the latter case, the control apparatuses 12 and 42 may use a priority signal to specify an implementation period of display prioritization control.

Specifically, prior to a time point at which the control apparatus 42 initiates implementation of display prioritization control, a beginning signal signifying that display prioritization control is initiated is outputted as a kind of priority signal from the control apparatus 42 to the control apparatus 12. After the control apparatus 12 terminates the implementation of display prioritization control, a completion signal signifying completion of display prioritization control may be outputted as a kind of priority signal from the control apparatus 12 to the control apparatus 42.

In case the implementation period of display prioritization control is specified with the beginning signal and ending signal, a resource of the control apparatuses 12 and 42 for the display prioritization control may be determined based on a display priority level.

As for determination of a resource of the control apparatuses 12 and 42 to be preserved based on a display priority level, for example, if an image meeting a first reference condition is present among images included in a video output command, exertion of a display function may be achieved for the image as a top priority.

As the image meeting the first reference condition, an image meeting many conditions is conceivable. For example, as an example of the image meeting the first reference condition, if all of a plurality of images that are successive along a time base are associated with display priority levels which are equal to or larger than a defined threshold, the set of images is conceivable.

In case the image meeting the first reference condition is recognized as mentioned above, preferably, a beginning signal is outputted prior to an outputting initiation time point of an image (hereinafter, referred to as a leading image) that is displayed first along a time base among images meeting the first reference condition. If display prioritization control is initiated by outputting the beginning signal, after the display prioritization control is completed, a completion signal is preferably outputted.

In this case, the beginning signal and completion signal may include a priority level based on which a resource is preserved in the control apparatuses 12 and 42. Namely, the resource of the control apparatuses 12 and 42 may be preserved based on the display priority level associated with an image.

As for a method of preserving a resource, for example, a degree of exertion of a display function may be designated in line with the lowest one of display priority levels associated with images included in a set of images. Otherwise, the degree of exertion of the display function may be designated according to a degree of priority represented by the largest number of display priority levels obtained by counting the numbers of identical display priority levels associated with the images included in the set of images.

Figure 11:
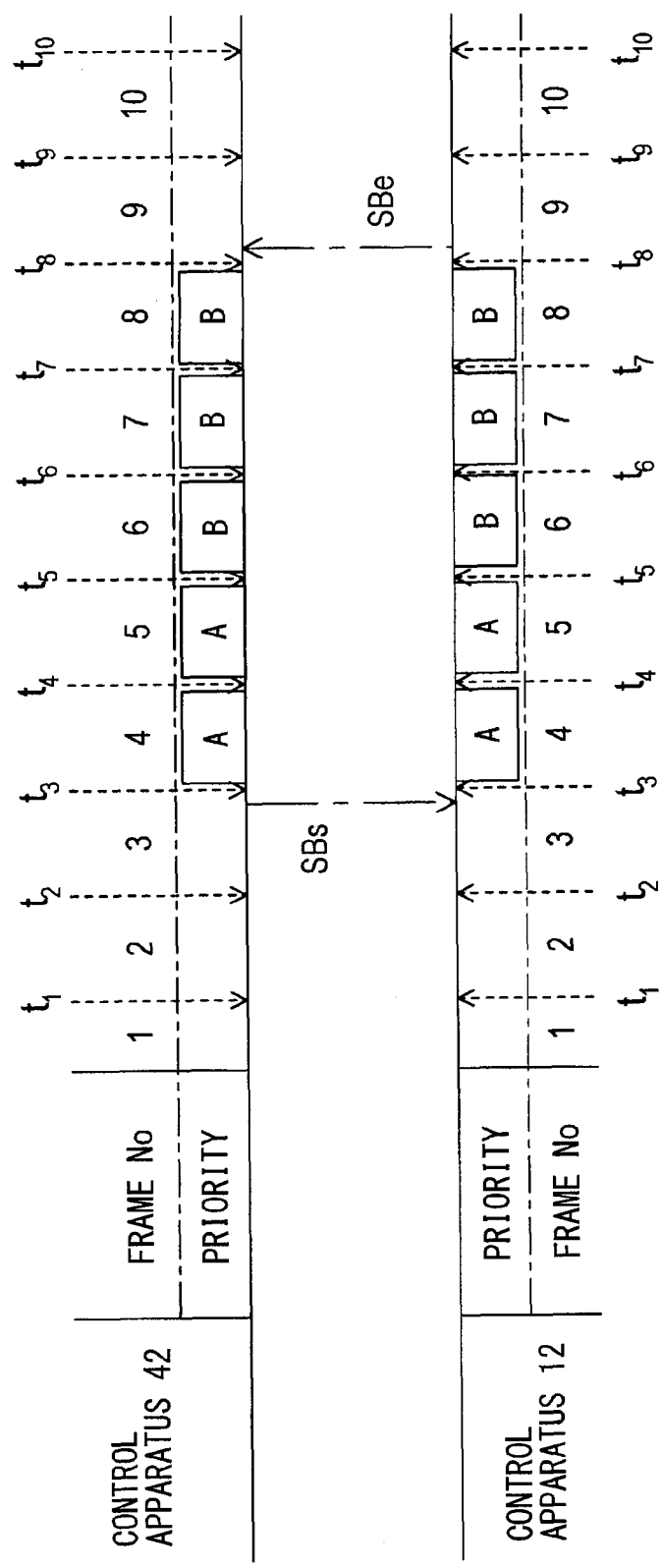
FIG. 11 is a time chart showing communicated states of control apparatuses in a variant of the second embodiment.

More particularly, as shown in FIG. 11, assume that priority level A and priority level B coexist as display priority levels associated with images included in a set of images, and that the number of images associated with priority level B is larger than the number of images associated with priority level A.

Under the assumption, preferably, an intermediate priority signal SBs signifying that exertion of a display function is achieved with a priority level lower by one level than the top priority is adopted as a beginning signal, and outputted prior to the outputting initiation time point of a leading image. Preferably, if display prioritization control is initiated by outputting the intermediate priority signal SBs as the beginning signal, after the display prioritization control is completed, an intermediate priority termination signal SBe signifying that the display prioritization control is completed is outputted as a completion signal.

A requirement for the image meeting the first reference condition is that an image associated with priority level A which is the highest degree of priority is present in a set of images meeting the condition.

Figure 12:
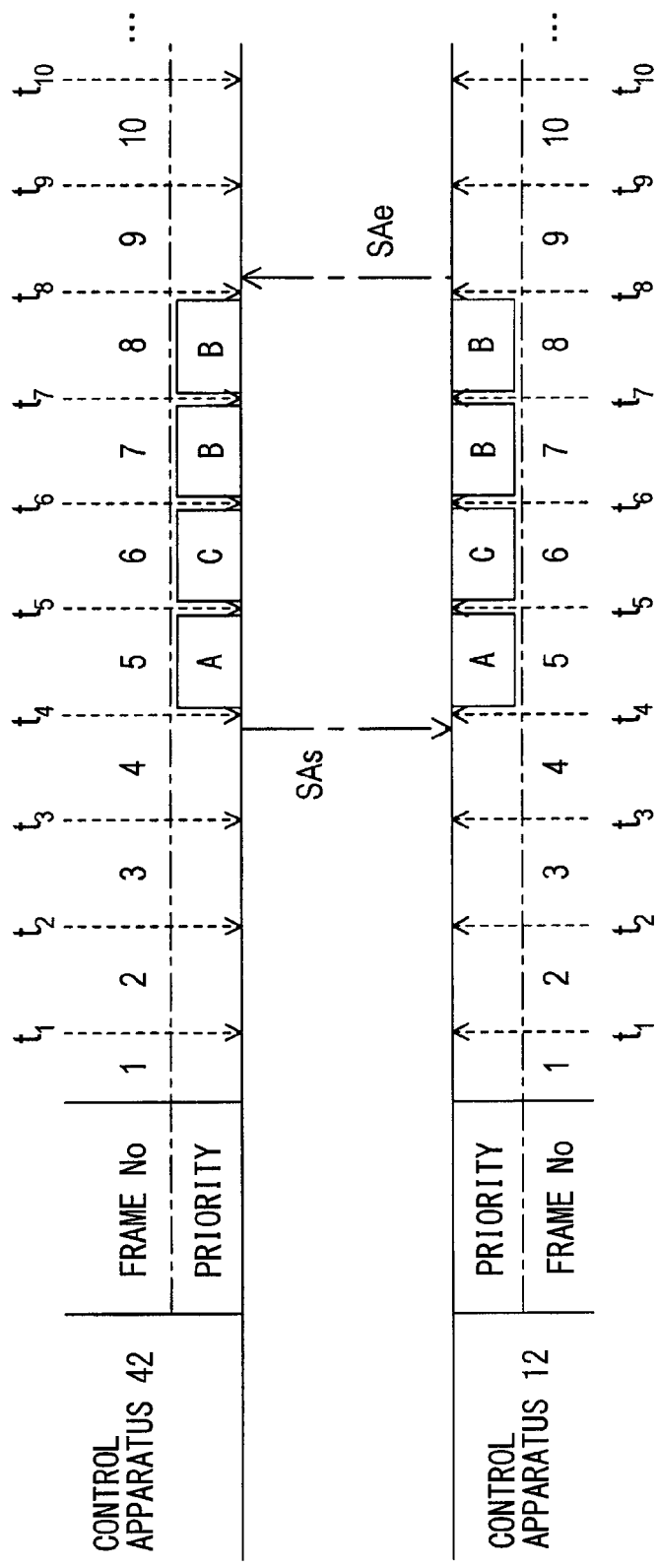
FIG. 12 is a time chart showing the communicated states of control apparatuses in a variant of the second embodiment.

In case the image meeting the first reference condition is recognized, as in FIG. 12, a high priority signal SAs signifying that exertion of a display function is achieved as a top priority is preferably outputted as a beginning signal prior to the outputting initiation time point of a leading image. If display prioritization control is initiated by outputting the high priority signal SAs as the beginning signal, after the display prioritization control is completed, a high priority termination signal SAe signifying that the display prioritization control is completed is preferably outputted as a completion signal.

Figure 13:
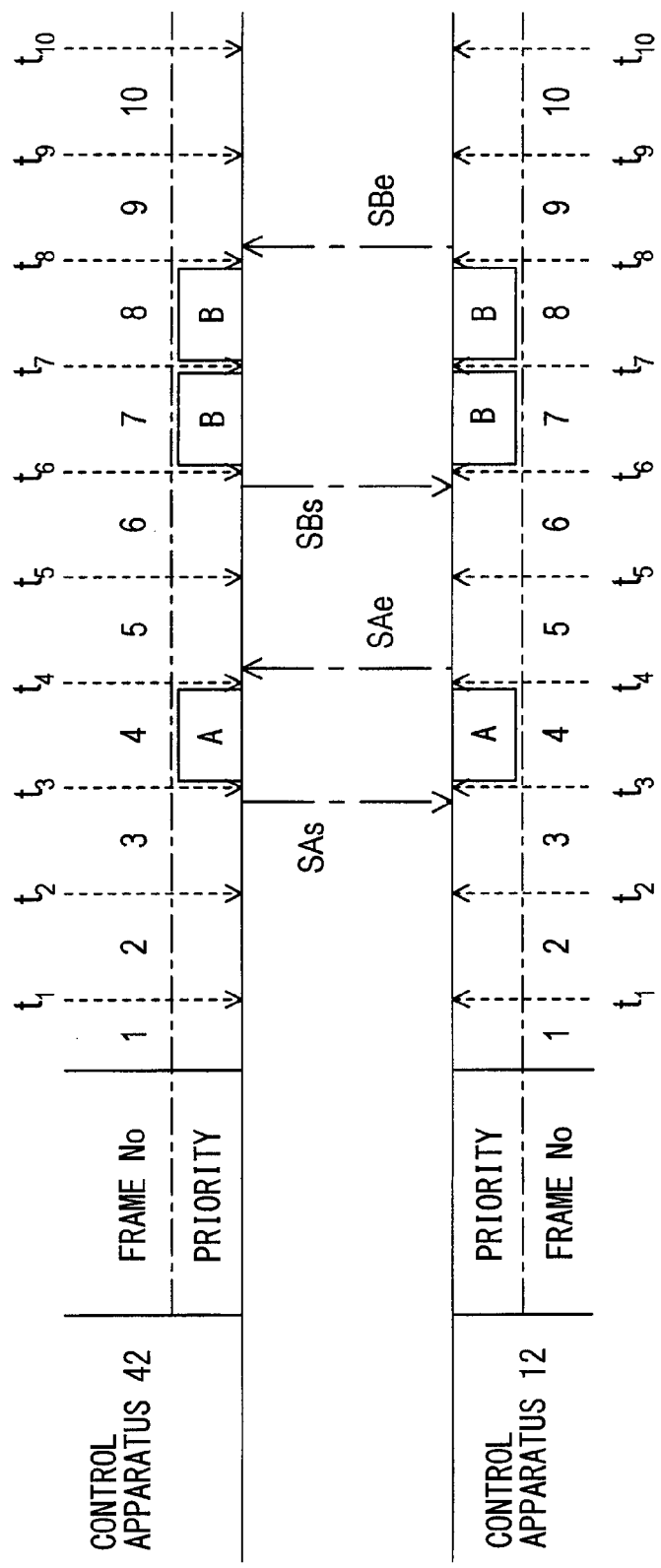
FIG. 13 is a time chart showing the communicated states of control apparatuses in a variant of the second embodiment.

By the way, if an implementation period of display prioritization control is specified with a beginning signal and ending signal, a time point at which implementation of display prioritization control is initiated and a time point at which the implementation is terminated are not limited to the aforesaid ones. For example, as shown in FIG. 13, the beginning signal may be outputted with every image, which is associated with a display priority level equal to or larger than a defined threshold, in order to implement display prioritization control. Every time the display prioritization control is completed, a completion signal may be outputted.

Other Embodiments

A form having part of the components of any of the aforesaid embodiments excluded to such an extent that the object of the present disclosure can be solved is regarded as an embodiment of the present disclosure. In addition, a form to be realized by appropriately combining any of the embodiments and any of the variants is regarded as an embodiment of the present disclosure. Further, a form that is specified with the wording in Claims and conceivable without a departure from the principle of the present disclosure is regarded as an embodiment of the present disclosure.

For example, the display groups 5 and 35 in the embodiments are a display group of a meter system and a display group of a navigation system respectively. The display groups 5 and 35 are not limited to them. Namely, any display groups will do as long as the display groups display various kinds of information and present the information to a person.

The display apparatus 8 may be a liquid crystal display included in a known navigation system or may be a known head-up display. The display apparatus 38 may be the known head-up display or a monitor incorporated in an instrument panel.

In the aforesaid embodiments, the onboard line Lc linking the control apparatuses 12 and 42 is included. However, the onboard line Lc may be excluded. In this case, the first operating state, second operating state, and priority signal may be communicated over the communication bus Ls.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An onboard display system including at least two control apparatuses, each control apparatus being connected to a display apparatus via a video line that transmits a video signal, each control apparatus achieving (i) a display function that displays a video based on the video signal and (ii) a non-display function that is at least one function different from the display function, a first control apparatus being any one of the at least two control apparatuses, the first control apparatus achieving the display function by executing a video output command that is previously prepared to include an image group of images that are displayed one by one in chronological order, the video output command serving as a command outputting the image group as a video, the first control apparatus comprising:

a first state acquisition section that acquires a first operating state that is an operating state of the first control apparatus itself;

a first state output section that outputs the first operating state acquired by the first state acquisition section to a second control apparatus via an onboard line that is a transmission line transmitting a signal, the second control apparatus being any one of the at least two control apparatuses excluding the first control apparatus, the second control apparatus being provided as an independent body separated from the first control apparatus and connected with the first control apparatus via the onboard line;

a second state acquisition section that acquires a second operating state that is an operating state of the second control apparatus;

a state determination section that determines whether a display prioritization state or a non-display prioritization state takes place, the display prioritization state taking place when both the first operating state and the second operating state prioritize realization of the display function over realization of the non-display function, the non-display prioritization state taking place when at least one of the first operating state and the second operating state prioritizes realization of the non-display function over realization of the display function; and an image update section that performs an image update control, the image update control executing an update of the images, which are included in the video displayed in the display apparatus in chronological order when the state determination section determines that the display prioritization state takes place, the image update control suspending the update of the images when the state determination section determines that the non-display prioritization state takes place.

2. The onboard display system according to claim 1, wherein:

the state determination section determines whether the display prioritization state or the non-display prioritization state takes place with predetermined time intervals; and the image update section performs the image update control each time the state determination section determines whether the display prioritization state or the non-display prioritization state takes place.

3. The onboard display system according to claim 1, wherein:
the first control apparatus further comprises a time acquisition section that acquires a present clock time that is a clock time at present;
the state determination section determines whether the display prioritization state or the non-display prioritization state takes place each time the present clock time acquired by the time acquisition section reaches a predetermined clock time; and
the image update section performs the image update control each time the state determination section determines whether the display prioritization state or the non-display prioritization state takes place.

4. An onboard display system including at least two control apparatuses that are connected via an onboard line that is a transmission line transmitting a signal, each control apparatus being connected to a display apparatus via a video line which transmits a video signal,
each control apparatus achieving a display function that displays a video based on the video signal and a non-display function that is at least one function different from the display function,
each control apparatus achieving the display function by executing a video output command that is previously prepared to include (i) an image group of images and (ii) a display priority level indicating a degree of a priority of each of the images against the realization of the non-display function, the images being displayed one by one in chronological order, the video output command serving as a as a command that outputs the image group as a video and
updating the images each time a predetermined clock time comes,
each control apparatus comprising:
a video interpretation section that acquires the video output command and determines whether a display prioritization state takes place or not based on a result of analyzing the acquired video output command, the display prioritization state taking place when realization of the display function is prioritized over realization of the non-display function; and
a function control section that performs a display prioritization control, wherein when the video interpretation section determines that the display prioritization state takes place, the display prioritization control suppresses realization of the non-display function while securing a resource necessary for realization of the display function to realize the display function preferentially.

5. The onboard display system according to claim 4, wherein:
the image interpretation section determines whether the display prioritization state takes place on basis of a whole of the video output command.

6. The onboard display system according to claim 4, wherein:
the image interpretation section determines whether the display prioritization state takes place on basis of each of the images in the video output command.

7. The onboard display system according to claim 6, wherein:
the at least two control apparatuses include a relation of a master and a slave;
the control apparatus serving as the master among the at least two control apparatuses is defined as a primary control apparatus;
the control apparatus serving as the slave among the at least two control apparatuses is defined as a secondary control apparatus;
the primary control apparatus comprises a beginning output section that outputs a beginning signal, which indicates a start of the display prioritization control, to the secondary control apparatus when the video interpretation section of the primary control apparatus determines that the display prioritization state takes place, while the function control section of the secondary control apparatus starts implementation of the display prioritization control when receiving the beginning signal from the beginning output section of the primary control apparatus; and
the secondary control apparatus comprises an ending output section that outputs an ending signal, which indicates an end of the display prioritization control, to the primary control apparatus when the display prioritization state ends, while the function control section of the primary control apparatus ends the implementation of the display prioritization control when acquiring the ending signal from the ending output section of the secondary control apparatus.

8. The onboard display system according to claim 7, wherein:
the display priority level is an index which indicates a degree of prioritizing realization of the display function over realization of the non-display function with respect to each of the images;
the beginning output section regards a first time point as an output time point of the beginning signal, the first time point being a time point when the degree of the display priority level becomes equal to or higher than a predetermined threshold value first in the video output command;
the ending output section regards a last time point as an output time point of the ending signal, the last time point being a time point when the degree of the display priority level becomes less than the predetermined threshold value last in the video output command.

9. The onboard display system according to claim 8, wherein:
in cases where, in the video output command, mutually different degrees of the display priority level that are equal to or higher than the predetermined value are assigned to a plurality of images arrayed continuously in chronological order,
the video interpretation section determines whether the display prioritization state takes place or not based on the display priority level indicating the degree that is lowest in the mutually different degrees assigned to the plurality of images.

10. The onboard display system according to claim 7, wherein:
the display priority level is an index which indicates a degree of prioritizing realization of the display function over realization of the non-display function with respect to each of the images;
the beginning output section regards, as an output time point of the beginning signal, each time point at which the degree of the display priority level becomes equal to or higher than a predetermined threshold value; and
the ending output section regards as an output time point of the ending signal, each time point at which the degree of the display priority level becomes less than the predetermined threshold value.

* * * * *